(12) United States Patent
Amemiya et al.

(10) Patent No.: US 9,636,989 B2
(45) Date of Patent: May 2, 2017

(54) DEVICE FOR CONTROLLING HYBRID VEHICLE

(71) Applicant: Nissan Motor Co., Ltd., Yokohama-shi, Kanagawa (JP)

(72) Inventors: Jun Amemiya, Kanagawa (JP); Munetoshi Ueno, Kanagawa (JP); Tatsuya Uchida, Kanagawa (JP); Noboru Kudo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/913,423

(22) PCT Filed: Aug. 8, 2014

(86) PCT No.: PCT/JP2014/071006
§ 371 (c)(1),
(2) Date: Feb. 22, 2016

(87) PCT Pub. No.: WO2015/045643
PCT Pub. Date: Apr. 2, 2015

(65) Prior Publication Data
US 2016/0200310 A1    Jul. 14, 2016

(30) Foreign Application Priority Data

Sep. 26, 2013   (JP) ................................ 2013-199649

(51) Int. Cl.
| | |
|---|---|
| *B60K 6/46* | (2007.10) |
| *B60W 20/00* | (2016.01) |
| *B60K 6/48* | (2007.10) |
| *B60K 6/547* | (2007.10) |

(Continued)

(52) U.S. Cl.
CPC ............... *B60K 6/48* (2013.01); *B60K 6/547* (2013.01); *B60L 11/14* (2013.01); *B60L 15/20* (2013.01);

(Continued)

(58) Field of Classification Search
CPC ................. Y02T 10/6286; B60K 6/48; B60W 2710/0644; B60W 2710/081; B60W 20/00
See application file for complete search history.

(56) References Cited

U.S. PATENT DOCUMENTS 5,713,814 A * 2/1998 Hara ...................... B60K 6/365
180/65.25
6,488,107 B1 * 12/2002 Ochiai ..................... B60K 6/48
180/65.25

(Continued)

FOREIGN PATENT DOCUMENTS

| | | | |
|---|---|---|---|
| JP | 9-150638 A | | 6/1997 |
| JP | 10084636 A | * | 3/1998 |
| JP | 2010143295 A | * | 7/2010 |

*Primary Examiner* — Behrang Badii
*Assistant Examiner* — David Testardi
(74) *Attorney, Agent, or Firm* — Global IP Counselors, LLP

(57) ABSTRACT

A hybrid vehicle control device includes an engine, a motor/generator, an automatic transmission in which the gear ratio can be fixed by the driver's intention; and a drive wheel. The control device has an assist traveling mode and an engine generation traveling mode as hybrid modes in which the engine and the motor/generator are drive sources. The control device includes a rotational speed limit setting unit which sets a value that exceeds the upper rotational speed limit, at which the motor/generator can carry out a torque output, as the rotational speed limit of the engine motor rotational speed, and a rotational speed limit control unit for reducing the rotational speed limit to the rotational speed limit at which the motor/generator can carry out a torque output, when the engine motor rotational speed has reached the rotational speed limit and there is a torque output request of the motor/generator.

17 Claims, 9 Drawing Sheets

(51) Int. Cl.
    *B60L 11/14*    (2006.01)
    *B60L 15/20*    (2006.01)
    *B60W 10/06*    (2006.01)
    *B60W 10/08*    (2006.01)
    *B60W 10/115*    (2012.01)
    *B60W 20/13*    (2016.01)

(52) U.S. Cl.
    CPC ............ *B60W 10/06* (2013.01); *B60W 10/08* (2013.01); *B60W 10/115* (2013.01); *B60W 20/00* (2013.01); *B60W 20/13* (2016.01); *B60W 2710/0644* (2013.01); *B60W 2710/081* (2013.01); *Y02T 10/6221* (2013.01); *Y02T 10/6286* (2013.01); *Y02T 10/7258* (2013.01)

(56) References Cited

U.S. PATENT DOCUMENTS

| | | | |
|---|---|---|---|
| 2001/0020789 A1* | 9/2001 | Nakashima | B60K 6/365 290/40 C |
| 2004/0010360 A1* | 1/2004 | Kishibata | F02B 63/04 123/3 |
| 2006/0089235 A1* | 4/2006 | Kobayashi | B60K 6/48 477/107 |
| 2006/0103239 A1* | 5/2006 | Kishibata | F02D 31/001 307/10.1 |
| 2008/0093865 A1* | 4/2008 | Komiyama | B60K 6/48 290/40 A |
| 2009/0243554 A1* | 10/2009 | Gu | B60K 6/48 320/162 |
| 2012/0004797 A1* | 1/2012 | Baino | B60K 6/48 701/22 |
| 2012/0203417 A1* | 8/2012 | Matsui | B60K 6/48 701/22 |
| 2012/0309586 A1* | 12/2012 | Jeong | B60W 10/08 477/5 |
| 2014/0088812 A1* | 3/2014 | Kobayashi | B60K 6/48 701/22 |
| 2014/0163794 A1* | 6/2014 | Park | B60W 20/40 701/22 |

\* cited by examiner

DEVICE FOR CONTROLLING HYBRID VEHICLE

CROSS-REFERENCE TO RELATED APPLICATIONS

This application is a U.S. National stage application of International Application No. PCT/JP2014/071006, filed Aug. 8, 2014. This application claims right of priority based on Japanese Patent Application No. 2013-199649 filed to the Japan Patent Office on Sep. 26, 2013, and the disclosure of which is hereby entirely incorporated herein by reference.

BACKGROUND

Field of the Invention

The present invention relates to a control device for a hybrid vehicle equipped with a transmission in which the gear ratio can be fixed by the driver's intention.

Background Information

A control device for a hybrid vehicle drive device which controls a transmission to shift up in order to reduce the rotational speed of the motor/generator when the rotational speed of the motor/generator exceeds a predetermined rotational speed is known. (For example, refer to Japanese Laid-Open Patent Application No. 1997-150638).

SUMMARY

However, in a conventional control device for a hybrid vehicle drive device, there is a problem that, when the rotational speed of a motor/generator exceeds a predetermined rotational speed in a hybrid vehicle in which the driver can select the gear shift stage, the gear shift stage transitions to a different gear shift stage than the one selected, against the will of the driver.

In view of the problem described above, an object of the present invention is to provide a hybrid vehicle control device that is able to meet an assist request or a power generation request while reflecting the high-load travel request of the driver.

In order to achieve the object above, the control device for a hybrid vehicle of the present invention comprises, in the drive system: an engine; a motor/generator to which is connected a battery that carries out charging/discharging; a transmission in which the gear ratio can be fixed by the driver's intention; and drive wheels. In addition, the control device comprises an assist traveling mode in which the motor/generator outputs a drive torque, and an engine generation traveling mode in which the motor/generator outputs a power generation torque, as hybrid modes in which the engine and the motor/generator are drive sources. This control device for a hybrid vehicle is provided with: a rotational speed limit setting means which sets a value that exceeds an upper rotational speed limit, at which the motor/generator can carry out a torque output, as the rotational speed limit of the engine-motor rotational speed; and a rotational speed limit control means for reducing the rotational speed limit to a rotational speed at which the motor/generator can carry out a torque output, when the engine-motor rotational speed has reached the rotational speed limit and there is a torque output request of the motor/generator, during the assist traveling mode.

Thus, the control device comprises a rotational speed limit setting means for setting the rotational speed limit of the engine-motor rotational speed, and a rotational speed limit control means for reducing that rotational speed limit to a rotational speed at which the motor/generator can carry out a torque output. In other words, during the assist traveling mode, when the engine-motor rotational speed has reached the rotational speed limit set by the rotational speed limit setting means and when there is a torque output request of the motor/generator, the rotational speed limit is reduced in a state in which the gear ratio is fixed. Accordingly, reflecting the high-load travel request of the driver becomes possible without shifting up the gear ratio. Furthermore, since the rotational speed limit that is set by the rotational speed limit setting means is reduced to a rotational speed limit at which the motor/generator can carry out a torque output, the torque output request of the motor/generator can be met whether for a drive torque or a power generation torque. As a result, an assist request or a power generation request can be met while reflecting the high-load travel request of the driver.

BRIEF DESCRIPTION OF THE DRAWINGS

Referring now to the attached drawings which form a part of this original disclosure.

DETAILED DESCRIPTION OF THE EMBODIMENTS

Figure 1:
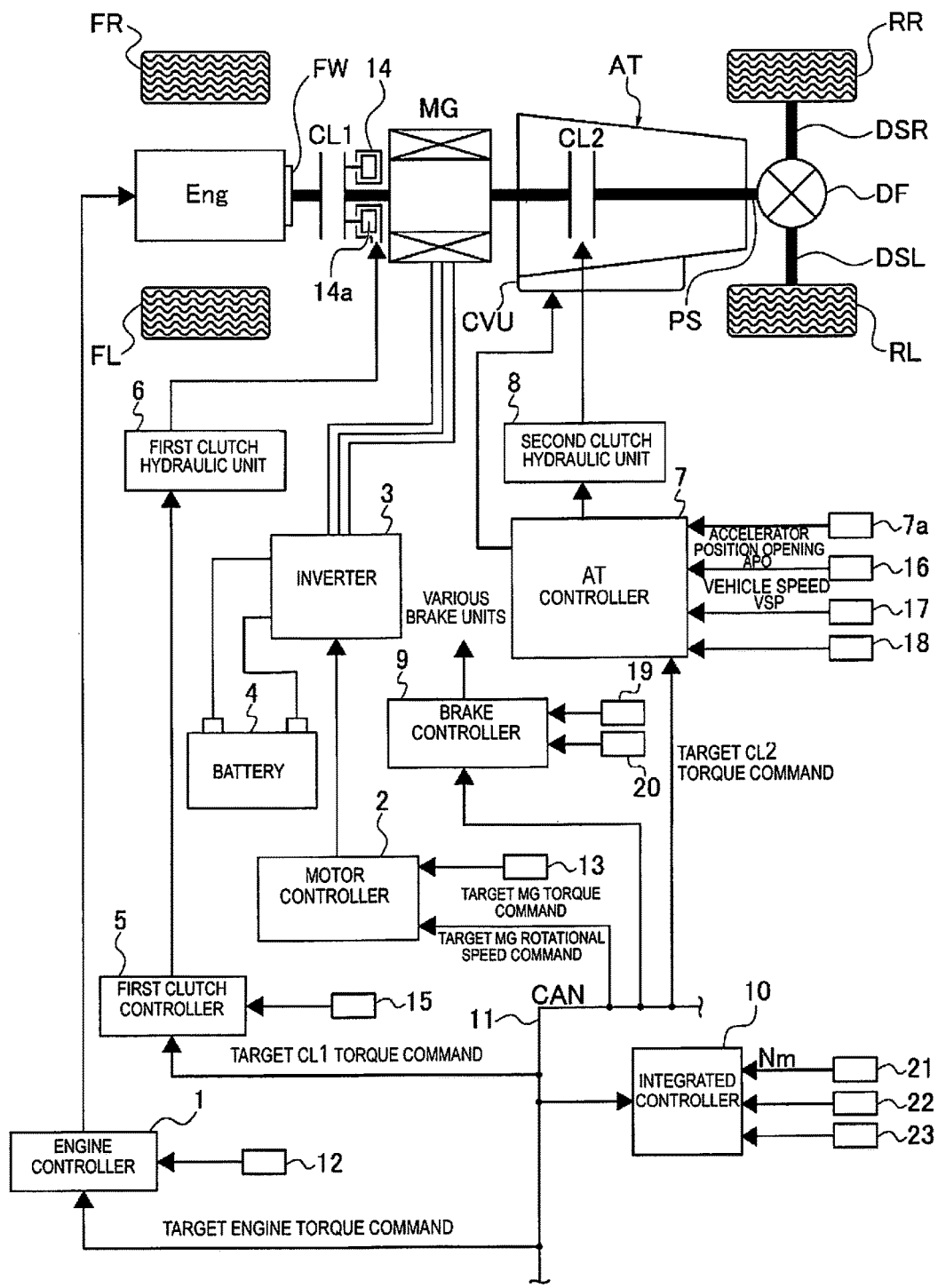
FIG. 1 is an overall system view illustrating a rear-wheel-drive FR hybrid vehicle (one example of an electric vehicle) to which is applied the control device of the first embodiment.

A preferred embodiment for realizing a hybrid vehicle control device of the present invention is described below based on the first embodiment illustrated in the drawings.

First Embodiment

The configuration is described first. FIG. 1 is an overall system view illustrating a rear-wheel-drive FR hybrid vehicle (one example of an electric vehicle) to which is applied the control device of the first embodiment.

The drive system of the FR hybrid vehicle of the first embodiment comprises an engine Eng, a flywheel FW, a first clutch CL1, a motor/generator MG (drive motor), a second clutch CL2, an automatic transmission AT, a propeller shaft PS (drive shaft), a differential DF, a left drive shaft DSL, a right drive shaft DSR, a left rear wheel RL (driving wheel), and a right rear wheel RR (driving wheel), as illustrated in FIG. 1. FL is the left front wheel and FR is the right front wheel.

The engine Eng is a gasoline engine or a diesel engine, in which engine start control, engine stop control, valve opening control of the throttle valve, fuel-cut control and the like are carried out on the basis of engine control commands from an engine controller 1. A flywheel FW is provided to the engine output shaft.

The first clutch CL1 is a clutch that is interposed between the engine Eng and the motor/generator MG, in which engagement/slip engagement (half-clutch state)/disengagement are controlled by a first clutch control hydraulic pressure produced by a first clutch hydraulic unit 6, on the basis of a first clutch control command from a first clutch controller 5. One example of a first clutch CL1 to be used is a normally closed dry single-plate clutch, in which the steps of slip engagement to full disengagement are controlled by a stroke control, using a hydraulic actuator 14 having a piston 14a, which maintains full engagement by a biasing force of a diaphragm spring.

The motor/generator MG is a synchronous motor/generator, in which a permanent magnet is embedded in a rotor and a stator coil is wound on the stator, and which is controlled by applying a three-phase AC that is produced by an inverter 3, based on a control command from a motor controller 2. This motor/generator MG may be operated as an electric motor that is rotationally driven by receiving a power supply from a battery 4 (this operating state is hereinafter referred to as "powering"), or, may function as an electric generator that generates electromotive force at both ends of the stator coil and charges the battery 4, when the rotor receives rotational energy from the engine Eng or the driving wheels (this operating state is hereinafter referred to as "regeneration"). The rotor of this motor/generator MG is connected to the transmission input shaft of the automatic transmission AT via a damper.

The second clutch CL2 is a clutch that is interposed between left and right rear wheels RL, RR and the motor/generator MG, in which engagement/slip engagement/disengagement are controlled by a control hydraulic pressure produced by a second clutch hydraulic unit 8, on the basis of a second clutch control command from an AT controller 7. Examples of a second clutch CL2 to be used include normally opened wet multi-plate clutch or wet multi-plate brake which can continuously control the oil flow amount and the hydraulic pressure with a proportional solenoid. The first clutch hydraulic unit 6 and the second clutch hydraulic unit 8 are incorporated in an AT hydraulic control valve unit CVU that is provided to the automatic transmission AT.

The automatic transmission (transmission) AT is a stepped transmission in which stepped gear shift stages (transmission ratio) of, for example, forward seven gears/reverse one gear are automatically switched in accordance with the vehicle speed, accelerator position opening amount, or the like, and the second clutch CL2 is, not one that is newly added as a dedicated clutch, but one in which an optimal clutch or brake that is disposed on a torque transmission path is selected from among a plurality of frictional engagement elements that are engaged at each gear shift stage of the automatic transmission AT. In this automatic transmission AT, the gear shift stage can be fixed (for example, at 2nd, Low, etc.) by the driver operating a select lever (driver's intention). The output shaft of the automatic transmission AT is connected to the left and right rear wheels RL, RR via the propeller shaft PS, the differential DF, the left drive shaft DSL, and the right drive shaft DSR.

The hybrid drive system of the first embodiment comprises travel modes such as an electric vehicle travel mode (hereinafter referred to as "EV mode"), a hybrid vehicle travel mode (or a hybrid mode. Hereinafter referred to as "HEV mode"), and a drive torque control travel mode (hereinafter referred to as "WSC mode").

The "EV mode" is a mode in which the first clutch CL1 is released and in which traveling is carried out with the motor/generator MG as the only drive source. The "HEV mode" is a mode in which the first clutch CL1 is engaged and in which traveling is carried out with the engine Eng and the motor/generator MG as the drive sources. This "HEV mode" is a mode in which traveling is carried out by one of the following modes: assist traveling mode; engine generation travel mode; or, engine traveling mode. The "WSC mode" is a mode in which starting is carried out while the slip-engaged state of the second clutch CL2 is maintained by controlling the rotational speed of the motor/generator MG, and the clutch torque capacity is controlled so that the clutch transmission torque which passes through the second clutch CL2 becomes the required drive torque which is determined in accordance with the vehicle state or a driver operation, at the time of starting by selecting P, N->D from the "HEV mode", or, at the time of D range starting from the "EV mode" or the "HEV mode." Meanwhile, "WSC" is an abbreviation for "Wet Start Clutch."

The above-described assist traveling mode/engine generation travel mode/engine traveling mode will be described. In the "assist traveling mode," the drive wheels RL, RR are moved by the power of the engine Eng and the motor/generator MG. That is, the motor/generator MG outputs a drive torque. In the "engine generation travel mode," the drive wheels RL, RR are moved by the power of the engine Eng, and the motor/generator MG is caused to function as a generator. During constant-speed operation or during acceleration operation, the motor/generator MG is caused to operate as a generator by utilizing the power of the engine Eng. In addition, during deceleration operation, the braking energy is regenerated to generate power with the motor/generator MG, which is used for charging the battery 4. That is, the motor/generator MG outputs a power generation torque. In the "engine traveling mode," the drive wheels RL, RR are moved by the power of the engine Eng.

The control system of the hybrid vehicle will be described next. The control system of the FR hybrid vehicle according to the first embodiment is configured to comprise an engine controller 1, a motor controller 2, an inverter 3, a battery 4, a first clutch controller 5, a first clutch hydraulic unit 6, an AT controller 7, a second clutch hydraulic unit 8, a brake controller 9, and an integrated controller 10, as illustrated in FIG. 1. The engine controller 1, the motor controller 2, the first clutch controller 5, the AT controller 7, the brake controller 9, the integrated controller 10 are connected via a CAN communication line 11 that allows information exchange with each other.

The engine controller 1 inputs engine rotational speed information from an engine rotational speed sensor 12, target engine torque commands from the integrated controller 10, and other necessary information. The controller then outputs a command for controlling an engine operating point (Ne: engine rotational speed, Te: engine output torque) to a throttle valve actuator of the engine Eng or the like.

The motor controller 2 inputs information from a resolver 13 which detects the rotational position of the rotor of the motor/generator MG, a target MG torque command and a target MG rotational speed command from the integrated controller 10, and other necessary information. The controller then outputs a command for controlling a motor operating point (Nm: motor rotational speed, Tm: motor output torque) of the motor/generator MG to the inverter 3. This motor controller 2 monitors the battery SOC which represents the charge capacity of the battery 4, and this battery SOC information is used for the control information of the motor/generator MG and supplied to the integrated controller 10 via a CAN communication line 11.

The first clutch controller 5 inputs sensor information from a first clutch stroke sensor 15 which detects the stroke position of a piston 14a of a hydraulic actuator 14, a target CL1 torque command from the integrated controller 10, and other necessary information. Then, the controller outputs a command to control the engagement/slip engagement/disengagement of the first clutch CL1 to a first clutch hydraulic unit 6 in an AT hydraulic control valve unit CVU.

The AT controller 7 inputs information from an accelerator position opening amount sensor 16, a vehicle speed sensor 17, other sensors 18 (transmission input rotational speed sensor, etc.), and information from an inhibitor switch 7a that outputs a signal (range position signal of the AT) corresponding to the position of a select lever which is operated by the driver. Then, when traveling while selecting the D range, the optimum gear shift stage is searched from the positions in which the operating point determined from the accelerator position opening amount APO and the vehicle speed VSP exists on a shifting map, and a control command for obtaining the searched gear shift stage is outputted to the AT hydraulic control valve unit CVU. A shifting map is a map in which are written an upshift line and a downshift line in accordance with the accelerator position opening amount and the vehicle speed. In addition to the automatic transmission control described above, when a target CL2 torque command is inputted from the integrated controller 10, a second clutch control is carried out in which a command to control the slip engagement of the second clutch CL2 is outputted to a second clutch hydraulic unit 8 in the AT hydraulic control valve unit CVU. Additionally, when a transmission control change command is outputted from the integrated controller 10, a transmission control in accordance with a transmission control change command is carried out instead of the normal transmission control.

The brake controller 9 inputs sensor information from a wheel speed sensor 19 that detects each of the wheel speeds of the four wheels and a brake stroke sensor 20, a regenerative cooperation control command from the integrated controller 10, and other necessary information. Then, for example, when the regenerative braking force is insufficient with respect to the requested braking force determined from a brake stroke BS when braking by depressing the brake pedal, a regenerative cooperation brake control is carried out so as to compensate for the lack by a mechanical braking force (hydraulic braking force or motor braking force).

The integrated controller 10 manages the energy consumption of the entire vehicle and assumes the function of running the vehicle at maximum efficiency; necessary information from a motor rotational speed sensor 21 that detects the motor rotational speed Nm, from a longitudinal acceleration sensor (acceleration detection means) 22 that detects the longitudinal acceleration, and from other sensor switches 23 as well as information via the CAN communication line 11 are input thereto. Then, a target engine torque command is outputted to the engine controller 1, a target MG torque command and a target MG rotational speed command are outputted to the motor controller 2, a target CL1 torque command is outputted to the first clutch controller 5, a target CL2 torque command is outputted to the AT controller 7, and a regenerative cooperation control command is outputted to the brake controller 9.

Figure 2:
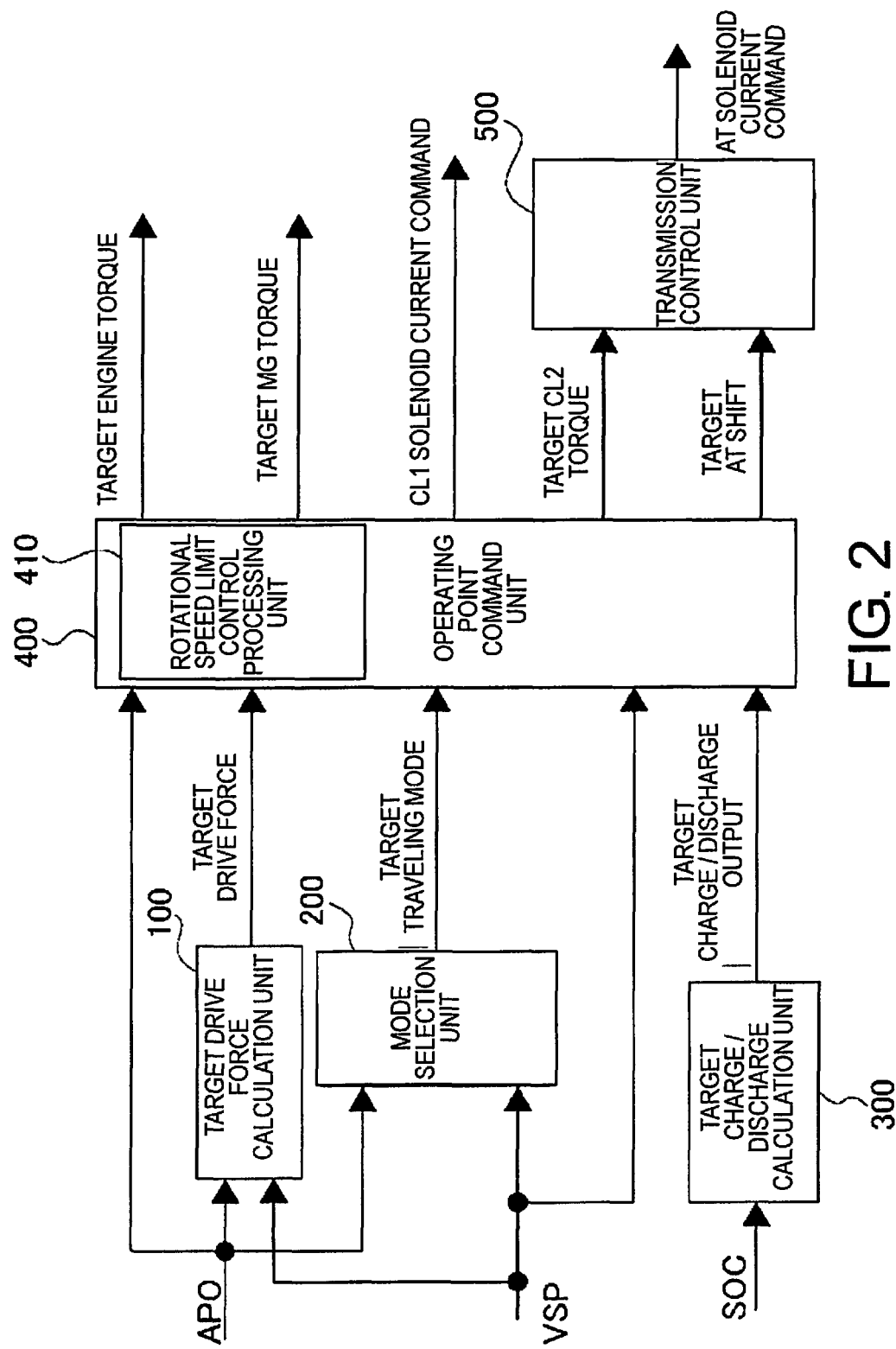
FIG. 2 is a control block view illustrating the calculation steps that are executed in an integrated controller 10 of an FR hybrid vehicle to which is applied the control device of the first embodiment.

FIG. 2 is a control block view illustrating the calculation steps that are executed in the integrated controller 10 of an FR hybrid vehicle to which is applied the control device of the first embodiment. The calculation steps that are executed in the integrated controller 10 of the first embodiment will be described below based on FIG. 2.

The integrated controller 10 comprises a target drive force calculation unit 100, a mode selection unit 200, a target charge/discharge calculation unit 300, an operating point command unit 400, and a transmission control unit 500, as illustrated in FIG. 2.

In the target drive force calculation unit 100, a target drive force tFo0 is calculated from the accelerator position opening amount APO and the vehicle speed VSP, using a target drive force map.

In the mode selection unit 200, a target traveling mode is calculated using a predetermined mode map. The mode map comprises an "EV traveling mode," a "WSC traveling mode," and an "HEV traveling mode," and the target traveling mode is calculated from the accelerator position opening amount APO and the vehicle speed VSP. In a predetermined region in which the APO is small and the VSP is a predetermined value or less, the "EV traveling mode" is selected. However, even if the "EV traveling mode" is selected, if the battery SOC is a predetermined value or less, the "HEV traveling mode" or the "WSC traveling mode" forcibly becomes the target traveling mode. The "WSC traveling mode" is set to a vehicle speed region that is lower than a lower limit vehicle speed VSP1 corresponding to the transmission output rotational speed when the automatic transmission AT is in the first gear stage during an idle rotation of the engine. The "WSC traveling mode" is configured to be selected, if the "EV traveling mode" cannot be achieved due to a low battery SOC when the vehicle is starting.

In the target charge/discharge calculation unit 300, a target charge/discharge power tP is calculated from the battery SOC, using a predetermined target charge/discharge amount map.

In the operating point command unit 400, a transient target engine torque, a target MG torque, a target CL2 torque capacity, a target transmission ratio (target AT shift), and a CL1 solenoid current command are calculated as the operating point arrival targets, based on input information such as the accelerator position opening amount APO, the target drive force tFo0, the target traveling mode, the vehicle speed VSP, and the target charge/discharge power tP. Then, these calculation results are outputted to each of the controllers 1, 2, 5, and 7, via the CAN communication line 11.

The transmission control unit 500 calculates an AT solenoid current command for carrying out a drive control of a solenoid valve inside the automatic transmission AT from the target CL2 torque capacity and the target transmission ratio (target AT shift) so as to achieve these targets, following a shifting schedule of the shifting map. The shifting map is one in which a target gear stage is set in advance on the basis of the vehicle speed VSP and the accelerator position opening amount APO. In the transmission control unit 500, the next gear shift stage is determined from the current gear shift stage on the basis of these pieces of information, and the shift clutch is controlled to shift gears if there is a gear shift request.

Figure 3:
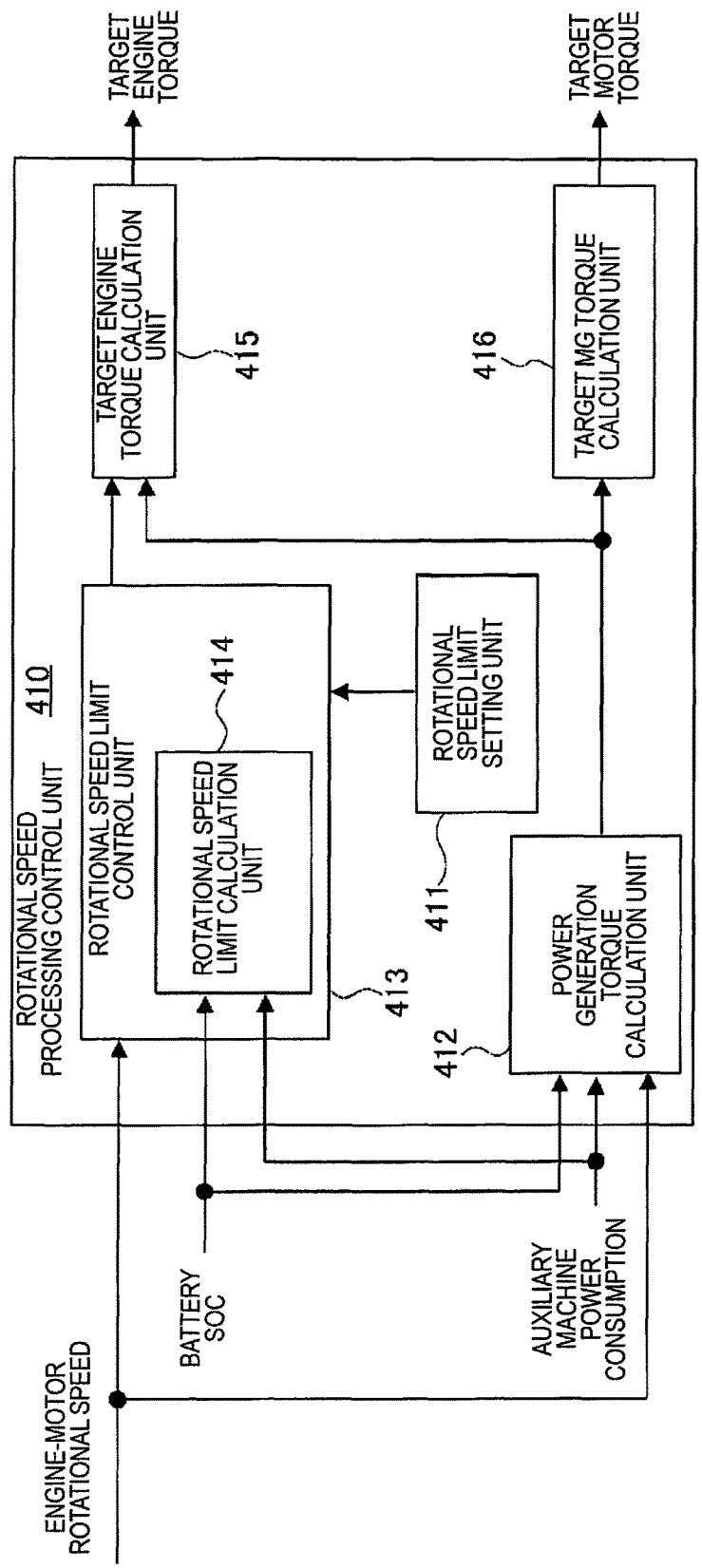
FIG. 3 is a block view illustrating the configuration of a rotational speed limit control processing unit of the FR hybrid vehicle to which is applied the control device of the first embodiment.

In addition, a rotational speed limit control processing unit 410 is provided to the operating point command unit 400. The rotational speed limit control processing unit 410 executes a control of the rotational speed limit of the engine-motor rotational speed Nem. This rotational speed limit control processing unit 410 comprises a rotational speed limit setting unit 411 (rotational speed limit setting means), a power generation torque calculation unit 412, a rotational speed limit control unit 413 (rotational speed limit control means), a rotational speed limit calculation unit 414 included in the rotational speed limit control unit 413, a target engine torque calculation unit 415, and a target MG torque calculation unit 416, as illustrated in FIG. 3.

In the rotational speed limit setting unit 411, the rotational speed limit La of the engine-motor rotational speed Nem in each of the gear shift stages is set. The rotational speed limit La is the upper limit value of the engine-motor rotational speed Nem, which is a value that exceeds the upper rotational speed limit at which the motor/generator MG can carry out a torque output.

In the power generation torque calculation unit 412, a power generation torque is calculated on the basis of the engine-motor rotational speed Nem, a battery storage requirement with respect to the battery 4, that is, the battery SOC and/or the magnitude of the auxiliary machine power consumption. Regarding this power generation torque, a higher power generation torque is calculated as the energy storage requirement with respect to the battery 4 increases. The energy storage requirement is determined to be higher as the auxiliary machine power consumption is increased, and the energy storage requirement is determined to be higher as the battery SOC is decreased.

The rotational speed limit control unit 413 comprises the rotational speed limit calculation unit 414, and controls the rotational speed limit by inputting the engine-motor rotational speed Nem, the battery SOC, the auxiliary machine power consumption, the rotational speed limit La from the rotational speed limit setting unit 411, and the rotational speed limit Lb from the rotational speed limit calculation unit 414.

In the rotational speed limit calculation unit 414, the rotational speed limit Lb at which the motor/generator MG can carry out a torque (in this case, the power generation torque) output is calculated on the basis of the energy storage requirement with respect to the battery 4, that is, the battery SOC and/or the magnitude of the auxiliary machine power consumption which is consumed by a plurality of auxiliary machines (for example, air conditioner, headlights, etc.) provided to the vehicle. Regarding this rotational speed limit Lb, a lower value is calculated as the energy storage requirement with respect to the battery 4 is increased. For example, the energy storage requirement is determined to be higher as the auxiliary machine power consumption is increased, and the energy storage requirement is determined to be higher as the battery SOC is decreased. That is, the value of the rotational speed limit Lb is varied in accordance with the energy storage requirement with respect to the battery 4.

In the rotational speed limit control unit 413, three controls are executed, a rotational speed limit control, a rotational speed limit reduction execution timing determination control, and a rotational speed limit deviation control. These controls are described in order below.

First, the rotational speed limit control will be described. In a state in which the gear shift stage is fixed by the driver's intention, during the assist traveling mode, when the engine-motor rotational speed Nem has reached the rotational speed limit La and when the torque output request (in this case, a power generation torque output request) of the motor/generator MG satisfies a certain rotational speed limit control condition, a rotational speed limit control is executed. In the rotational speed limit control, a control is executed in which the rotational speed limit La set by the rotational speed limit setting unit 411 is reduced to a rotational speed limit Lb at which the motor/generator MG can carry out a torque output. That is the assist traveling mode becomes the engine generation travel mode. In addition, when reducing the rotational speed limit La to the rotational speed limit Lb, reduction is carried out at a predetermined change rate which does not affect the vehicle behavior (operation). When the rotational speed limit control condition is not satisfied, this control is not executed, and the rotational speed limit La is maintained.

The power generation torque output request determines the presence/absence of this request based on the battery SOC and/or the magnitude of the auxiliary machine power consumption. For example, when the battery SOC is equal to or less than a predetermined threshold value, or, when the auxiliary machine power consumption is being outputted, a power generation torque output request is determined to be present.

Next, the rotational speed limit reduction execution timing determination control will be described. A rotational speed limit reduction execution timing determination control, which determines the execution timing (=start time) for reducing the rotational speed limit La is executed. The determination of this execution timing is executed in accordance with the energy storage requirement with respect to the battery SOC. For example, this energy storage requirement is at least the battery SOC.

The execution timing for reducing this rotational speed limit La is when the battery SOC is equal to or less than a threshold value A (for example, 40%). For example, the threshold value A is a value at which charging is forcibly started even during the assist traveling mode, as it is necessary to charge the battery SOC, when the traveling characteristic of the vehicle to which the first embodiment is applied is a normal traveling mode (mode that emphasizes the normal traveling performance). Charging is started while giving a margin to the battery SOC. The normal traveling mode is a traveling mode during normal traveling, in which at least one from among an automatic transmission gear shift characteristic, an engine output characteristic, a suspension characteristic, and the like, is set to a characteristic suitable for normal traveling.

This execution timing is, basically, the same as the "power generation torque output request of the motor/generator MG" described with respect to the rotational speed limit control. However, when the battery SOC is not equal to or less than the threshold value A and the auxiliary machine power consumption can be covered for by the battery SOC, the reduction of the rotational speed limit La is not executed until the battery SOC becomes equal to or less than the threshold value A. That is, when the torque output request is only for covering for the auxiliary machine power consumption, it is not determined to be the execution timing for reducing the rotational speed limit La.

Next, the rotational speed limit deviation control will be described. When a deviation condition is met, in which the engine-motor rotational speed Nem deviates from the rotational speed limit Lb (the reduced rotational speed limit), a rotational speed limit deviation control is executed, which restores the rotational speed limit Lb to the rotational speed limit La.

This deviation condition shall be "when the engine-motor rotational speed Nem is reduced to equal to or less than a predetermined value (threshold value C)." For example, the predetermined value (threshold value C) is a value that does not include error in the engine-motor rotational speed Nem, and a value that does not include unstable states in which the engine-motor rotational speed Nem is repeatedly increased to the rotational speed limit and decreased from the rotational speed limit. Here, the engine generation traveling mode is, for example, ended when the battery SOC is charged to a threshold value A' (for example, 60% or greater), and in the first embodiment, continued until the deviation condition is satisfied. The EV traveling mode becomes easy to select by the battery SOC being charged to this threshold value A'. Accordingly, the threshold value A' is a value with which fuel economy can be improved (for example 60% or greater).

In the target engine torque calculation unit 415, a power generation torque from the power generation torque calculation unit 412 and the rotational speed limit from the rotational speed limit control unit 413 are inputted to calculate the target engine torque. Then, this calculation result is outputted to the engine controller 1 via the CAN communication line 11.

In the target MG torque calculation unit 416, the power generation torque from the power generation torque calculation unit 412 is inputted to calculate the target motor torque. This calculation result is outputted to the motor controller 2 via the CAN communication line 11.

Next, the steps in the control system of the FR hybrid vehicle to which is applied the rotational speed limit control processing unit 410 of the first embodiment will be described. Each step will be described below, based on the flowchart of FIG. 4.

In step S1, it is determined whether or not the gear shift stage has been fixed by the driver's intention. If YES (gear shift stage fixed state), the steps proceeds to step S2. If NO (gear shift stage automatic), step S1 is repeated.

In step S2, following the determination of the gear shift stage fixed state in step S1, it is determined whether or not the engine-motor rotational speed Nem has reached the rotational speed limit La. If YES (engine-motor rotational speed Nem has reached the rotational speed limit La), the engine torque is reduced, and the steps proceeds to step S3. If NO (engine-motor rotational speed Nem has not reached the rotational speed limit La), step S2 is repeated.

In step S3, following the determination that the engine-motor rotational speed Nem has reached the rotational speed limit La in step S2, it is determined whether or not the battery SOC is equal to or less than the threshold value A. That is, since a power generation torque output request of the motor/generator MG is present, it is determined to be an execution timing for reducing the rotational speed limit La. If YES (the battery SOC is equal to or less than the threshold value A), the steps proceeds to step S4. If NO (the battery SOC is greater than the threshold value A), step S3 is repeated.

In step S4, following the determination that the battery SOC is equal to or less than the threshold value A in step S3, the rotational speed limit Lb1 and the power generation torque corresponding to the battery SOC are calculated, and the steps proceeds to step S5.

In step S5, following the calculation of the rotational speed limit Lb1 and the power generation torque in step S4, the engine torque, the motor torque, and the rotational speed limit are controlled on the basis of these calculation results, and the steps proceeds to step S6.

In step S6, following the control of the engine torque, the motor torque, and the rotational speed limit in step S5, it is determined whether or not the auxiliary machine power consumption has increased. That is, a case when there is a power generation torque output request of the motor/generator MG again. If YES (the auxiliary machine power consumption has increased), the steps proceeds to step S7. If NO (the auxiliary machine power consumption has not increased), step S6 is repeated.

In step S7, following the determination that auxiliary machine power consumption has increased in step S6, the rotational speed limit Lb2 and the power generation torque corresponding to the auxiliary machine power consumption and the battery SOC are calculated, and the steps proceeds to step S8. The rotational speed limit Lb2 is a lower value than the rotational speed limit Lb1, and the power generation torque output in step S7 will be greater than the power generation torque output in step S5.

In step S8, following the calculation of the rotational speed limit Lb2 and the power generation torque in step S7, the engine torque, the motor torque, and the rotational speed limit are controlled on the basis of these calculation results, and the steps proceeds to step S9.

In step S9, following the control of the rotational speed limit Lb2 and the motor torque in step S8, it is determined whether or not the deviation condition has been satisfied. This deviation condition is, as described above, "when the engine-motor rotational speed Nem is reduced to equal to or less than a predetermined value (threshold value C)." If YES (the deviation condition has been satisfied), the steps proceeds to step S10. If NO (the deviation condition has not been satisfied), step S9 is repeated.

In step S10, following the satisfaction of the deviation condition in step S9, the rotational speed limit Lb2 is restored to the rotational speed limit La, and the steps proceeds to End.

Next, the actions are described. The "rotational speed limit control processing action," the "rotational speed limit control action," the "rotational speed limit variable action," the "rotational speed limit reduction execution timing determination control," and the "rotational speed limit deviation control action," will be separately described regarding the actions in the first embodiment.

Rotational Speed Limit Control Processing Action

Figure 4:
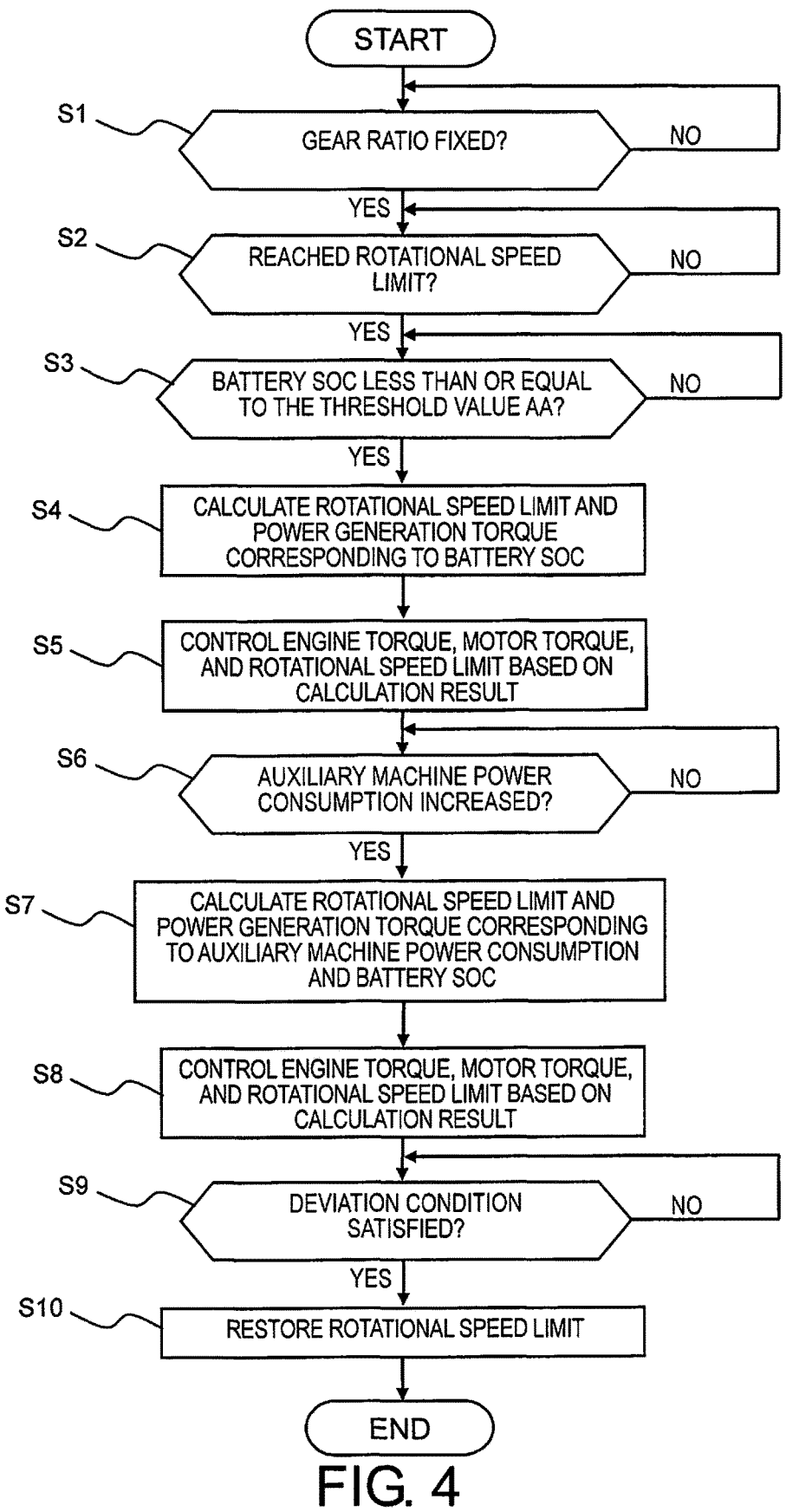
FIG. 4 is a flowchart illustrating the steps in the control system of the FR hybrid vehicle to which is applied the rotational speed limit control processing unit 410 of the first embodiment.

First, of the rotational speed limit control process operations, the rotational speed limit control that reduces the rotational speed limit La to the rotational speed limit Lb1 is the flow: step S1->step S2->step S3->step S4->step S5 in the flowchart in FIG. 4. That is, the rotational speed limit control is executed when the engine-motor rotational speed Nem has reached the rotational speed limit La and the battery SOC is equal to or less than the threshold value A, in a gear shift stage fixed state. That is, the rotational speed limit Lb1 corresponding to the battery SOC is calculated by the rotational speed limit calculation unit 414 in step S4 and the power generation torque corresponding to the battery SOC is calculated by the power generation torque calculation unit 412. Additionally, a rotational speed limit control is executed in which the rotational speed limit La is reduced to a rotational speed limit Lb at which the motor/generator MG can carry out a torque output by the rotational speed limit control unit 413, in step S5. That is, the engine torque, the motor torque, and the rotational speed limit La are controlled on the basis of the results of the calculated rotational speed limit Lb1 and power generation torque. Since the motor/generator MG can thereby carry out a torque output, the power generation torque is outputted.

Next, of the rotational speed limit control process operations, the rotational speed limit reduction execution timing determination control that determines the execution timing for reducing the rotational speed limit La is step S3 in the flowchart in FIG. 4. That is, in the case of YES in step S3, since a power generation torque output request of the motor/generator MG is present, it is determined to be an execution timing for reducing the rotational speed limit La. In the case of NO in step S3, it is not determined to be an execution timing for reducing the rotational speed limit La.

Next, the rotational speed limit control in which the rotational speed limit La is reduced to the rotational speed limit Lb1, after which the rotational speed limit is reduced again is the flow: step S6->step S7->step S8 in the flowchart in FIG. 4. That is, the rotational speed limit control is executed when there is a power generation torque output request of the motor/generator MG again due to a rise in the auxiliary machine power consumption. That is, the rotational speed limit Lb2 corresponding to the auxiliary machine power consumption and the battery SOC is calculated by the rotational speed limit calculation unit 414 in step S7 and the power generation torque corresponding to the auxiliary machine power consumption and the battery SOC is calculated by the power generation torque calculation unit 412. Additionally, a rotational speed limit control is executed in which the rotational speed limit Lb1 is reduced to a rotational speed limit Lb2 at which the motor/generator MG can carry out a torque output by the rotational speed limit control unit 413, in step S8. That is, the engine torque, the motor torque, and the rotational speed limit Lb1 are controlled on the basis of the results of the calculated rotational speed limit Lb2 and power generation torque. Since the motor/generator MG can thereby carry out a torque output, the power generation torque is outputted.

Next, of the rotational speed limit control process operations, the rotational speed limit deviation control that restores the rotational speed limit Lb to the rotational speed limit La is the flow: step S9->step S10 in the flowchart in FIG. 4. That is, the rotational speed limit Lb is restored to the rotational speed limit La when the engine-motor rotational speed Nem is reduced to equal to or less than a predetermined value (threshold value C), satisfying the deviation condition. The rotational speed limit Lb which has been reduced in two stages is restored to the rotational speed limit La which is set by the rotational speed limit setting unit 411.

Figure 5:
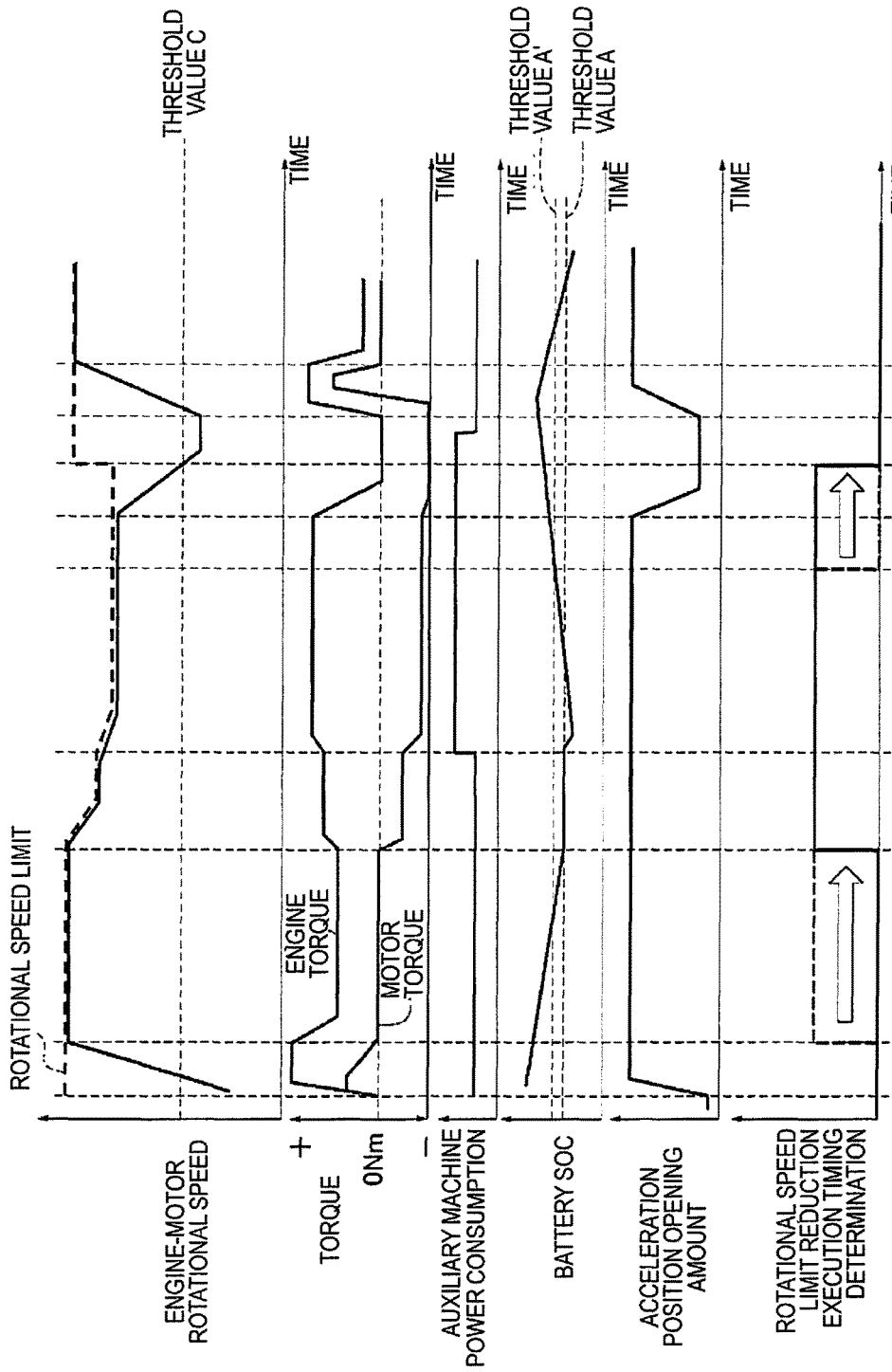
FIG. 5 is a time chart illustrating an operational example of the rotational speed limit control processing action of the first embodiment.

Next, the rotational speed limit control processing action will be described regarding each time, on the basis of the operation example illustrated in the time chart in FIG. 5. The vertical axis in FIG. 5 illustrates, in order from the top, the engine-motor rotational speed Nem (solid line) and the rotational speed limit of the engine-motor rotational speed Nem (broken line), the engine torque (ENG torque) and the motor/generator torque (MG torque), the auxiliary machine power consumption, the battery SOC, the accelerator position opening amount, and the rotational speed limit reduction execution timing determination. The horizontal axis in FIG. 5 represents time, and "t" represents the time. Regarding the torque, the positive side is the drive torque and the negative side is the power generation torque.

At time t0, the driver starts to depress the accelerator, and the assist traveling mode is started. At this time, the auxiliary machine power consumption is being outputted, which is covered for by the battery SOC. This time corresponds to START in the flowchart in FIG. 4.

Between time t0-time t1 is the gear shift stage fixed state, in which the gear shift stage is fixed by the driver's intention, before the gear shift stage is changed by the automatic transmission AT. The state may be the gear shift stage fixed state at time t0 as well. At this time, the driver is depressing the accelerator and the accelerator position opening amount APO is increasing. As a result, the engine-motor rotational speed Nem, the engine torque, and the motor torque are being increased. In addition, during this time, since the auxiliary machine power consumption is covered for by the battery SOC, the battery SOC is being reduced. Then, the accelerator position opening amount APO becomes constant in the middle. This period is the flow: START->step S1 (YES)->step S2 (NO) in the flowchart in FIG. 4, corresponding to the repetition of step S2. When step S1 is NO, the steps does not proceed after time t1.

Time t1 is the rotational speed limit arrival time at which the engine-motor rotational speed Nem has reached the rotational speed limit La. At this time, the reduction of the engine torque is started from time t1. This is to prevent an over-rotation of the engine rotational speed. The motor torque is zero, since the motor/generator MG is not at the engine-motor rotational speed Nem at which torque output is possible. However, the assist traveling mode is continued as the motor torque is zero. Additionally, since an auxiliary machine power consumption is being outputted, a power generation torque output request of the motor/generator MG is present. However, since the auxiliary machine power consumption is covered for by the battery SOC, and the battery SOC is not equal to or less than the threshold value A, it is not determined to be the execution timing for reducing the rotational speed limit La. This time corresponds to step S2 (YES) in the flowchart in FIG. 4.

Between time t1-time t2, since the auxiliary machine power consumption is continuously being covered for by the battery SOC from time t0, the battery SOC is being reduced, but the battery SOC is not equal to or less than the threshold value A. This period is the flow step S2 (YES)->step S3 (NO) in the flowchart in FIG. 4, corresponding to the repetition of step S3.

At time t2, the battery SOC is equal to or less than the threshold value A. That is, since a power generation torque output request of the motor/generator MG is present, it is determined to be an execution timing for reducing the rotational speed limit La (step S3 (YES)). At this time, the assist traveling mode is in effect, and the engine-motor rotational speed Nem has reached the rotational speed limit La. Accordingly, a rotational speed limit control is executed in which the rotational speed limit La is reduced to the rotational speed limit Lb1 at which the motor/generator MG can carry out a torque output, so that the battery SOC is not reduced to less than the threshold value A. The power generation torque output from the motor/generator MG is started along with the start of the reduction of the rotational speed limit La. Additionally, since the accelerator position opening amount APO is constant, the engine torque is increased in accordance with the power generation torque amount of the motor/generator MG, in order to maintain traveling. The generated power may be charged in the battery 4 and charged power may be used to cover for the auxiliary machine power consumption, or, may be directly supplied to auxiliary machines without interposing the battery 4. The assist traveling mode is thereby switched to the engine generation traveling mode. This time corresponds to the flow: step S3 (YES)->step S4->step S5 in the flowchart in FIG. 4.

Between time t2-t3, the amount of generated power by the power generation torque is an amount of generated power that can cover for the auxiliary machine power consumption that is being output, as illustrated in FIG. 5. Accordingly, the battery SOC is in a state of maintaining the threshold value A. This period is the flow: step S5->step S6 (NO) in the flowchart in FIG. 4, corresponding to the repetition of step S6.

At time t3, a power generation torque output request of the motor/generator MG is present again, due to a rise in the auxiliary machine power consumption. At this time, the energy storage requirement becomes higher than prior to time t3, due to the rise in the auxiliary machine power consumption and the charging of the battery SOC. Accordingly, the rotational speed limit Lb1 is further reduced to the rotational speed limit Lb2. Power generation torque is outputted from the motor/generator MG along with the reduction of the rotational speed limit. Additionally, since the accelerator position opening amount APO is constant, the engine torque is increased further in accordance with the power generation torque amount of the motor/generator MG, in order to maintain traveling. The generated power is charged in the battery SOC, and a part of the charged battery covers for the auxiliary machine power consumption. This time corresponds to the flow: step S6 (YES)->step S7->step S8 in the flowchart in FIG. 4.

Between time t3-t4, the amount of generated power by the power generation torque is an amount of generated power that can cover for the auxiliary machine power consumption that is being output, as well as charge the battery SOC, as illustrated in FIG. 5. The battery SOC is charged for this reason. Since the change rate of the rotational speed limit is lower than time t2-time t3, the battery SOC is increased slightly later than the reduction of the rotational speed limit. This period is the flow step S8->step S9 (NO) in the flowchart in FIG. 4, corresponding to the repetition of step S9.

At time t4, the battery SOC exceeds the threshold value A', but the rotational speed limit Lb2 is not restored to the rotational speed limit La, and the current state is maintained. This time is step S9 (NO) in the flowchart in FIG. 4, corresponding to the repetition of step S9.

Between time t4-time t5, since the deviation condition to restore the rotational speed limit Lb2 to the rotational speed limit La has not been satisfied, the rotational speed limit Lb2 is maintained and the battery SOC continues to rise. This period is step S9 (NO) in the flowchart in FIG. 4, corresponding to the repetition of step S9.

At time t5, the engine-motor rotational speed Nem and the engine torque are reduced, accompanying a reduction in the accelerator position opening amount APO which is started due to the driver releasing the foot from the accelerator. Since the vehicle is decelerated, the motor/generator MG outputs more power generation torque. This time is step S9 (NO) in the flowchart in FIG. 4, corresponding to the repetition of step S9.

Between time t5-time t6, the accelerator position opening amount APO is continuously reduced, and the engine-motor rotational speed Nem as well as the engine torque are continuously reduced, from time t5. In addition, the motor/generator MG outputs more power generation torque. This period is step S9 (NO) in the flowchart in FIG. 4, corresponding to the repetition of step S9.

At time t6, the engine-motor rotational speed Nem is reduced to a threshold value C or less. That is, since the deviation condition is satisfied, the rotational speed limit Lb2 is restored to the rotational speed limit La. This time corresponds to the flow: step S9 (YES)->step S10 in the flowchart in FIG. 4.

Between time t6-time t7, since the vehicle is continuing to decelerate, the motor/generator MG outputs more power generation torque. The auxiliary machine power consumption becomes the power of time t0-time t3 mid-course. This time corresponds to step S10->END in the flowchart in FIG. 4.

At time t7, the engine-motor rotational speed Nem and the engine torque are increased, accompanying an increase in the accelerator position opening amount APO due to the driver starting to depress the accelerator. At this time, the motor/generator MG still outputs a power generation torque. This time does not have a corresponding step in the flowchart in FIG. 4.

Between time t7-time t8, the accelerator position opening amount APO, along with the engine-motor rotational speed Nem and the engine torque, are continuously increased from time t7. In addition, the motor/generator MG switches from an output of a power generation torque to an output of a drive torque. If the state becomes the gear shift stage fixed state during this time, this period is the flow: START->step S1 (YES)->step S2 (NO) in the flowchart in FIG. 4, corresponding to the repetition of step S2. In other words, the control of FIG. 4 is started.

The actions at time t8 are the same as at time t1, so the descriptions thereof are omitted.

Rotational Speed Limit Control Action

For example, a control device for a hybrid vehicle drive device equipped with an engine, a motor generator, and a transmission, comprising a parallel hybrid control means for adding/subtracting the output of the motor generator to/from the output of the engine, and a shift-up control means for upshifting the transmission when the rotational speed of the motor generator exceeds a predetermined rotational speed during said parallel hybrid control, shall be the Comparative Example. The control device for a hybrid vehicle drive device of this Comparative Example is configured to control the transmission to shift up in order to reduce the rotational speed of the motor/generator, when the rotational speed of the motor/generator exceeds a predetermined rotational speed. That is, the device is configured to carry out a control to shift up the transmission, in order to meet the torque output request of the motor/generator.

However, when the rotational speed of the motor/generator exceeds a predetermined rotational speed in a hybrid vehicle in which the driver can select the gear shift stage, the gear shift stage transitions to a different gear shift stage than the one selected, against the will of the driver.

In this manner, there is the problem that the gear shift stage transitions to a different gear shift stage than the one selected, against the will of the driver.

In contrast, in the first embodiment, a configuration was employed which is provided with a rotational speed limit setting unit 411 (rotational speed limit setting means) for setting the rotational speed limit La of the engine-motor rotational speed Nem, and a rotational speed limit control unit 413 (rotational speed limit control means) for reducing that rotational speed limit La to the rotational speed limit Lb at which the motor/generator MG can carry out a torque output. In other words, during the assist traveling mode, when the engine-motor rotational speed Nem has reached the rotational speed limit La set by the rotational speed limit setting unit 411 and when there is a torque output request of the motor/generator MG, the rotational speed limit La is reduced in a state (time t1-time t2) in which the gear shift stage (gear ratio) is fixed. Accordingly, reflecting the high-load travel request of the driver becomes possible without shifting up the gear ratio. Furthermore, since the rotational speed limit La that is set by the rotational speed limit setting unit 411 is reduced to a rotational speed limit Lb at which the motor/generator MG can carry out a torque output (time t2, time t2-time t3), the torque output request of the motor/generator MG can be met, even for a power generation torque. Additionally, the torque output request of the motor/generator MG can be met, even for a drive torque. That is, power and regeneration can be carried out by the motor/generator MG. Accordingly, it is possible to respond to hybrid traveling modes such as the assist traveling mode and the engine generation traveling mode. As a result, an assist request or a power generation request can be met while reflecting the high-load travel request of the driver.

Rotational Speed Limit Variable Action

In the first embodiment, a configuration was employed in which the rotational speed limit La is reduced more as the energy storage requirement with respect to the battery SOC becomes higher.

That is, the rotational speed limit is reduced to a rotational speed limit Lb corresponding to the auxiliary machine power consumption and the battery SOC which are inputted to the rotational speed limit calculation unit 414 (time t2-time t3, time t3-time t4).

As a result, the electric storage requirement can be reliably met, by reducing to a rotational speed limit Lb corresponding to the energy storage requirement.

In addition, the energy storage requirement is configured to be determined higher as the battery SOC is reduced (the rotational speed limit variable action by the battery SOC). For example, as illustrated by time t2 in FIG. 5, the rotational speed limit La is reduced to the rotational speed limit Lb1 so that the battery SOC is not reduced to less than the threshold value A. Accordingly, preventing the battery SOC from being reduced to less than the threshold value A is possible.

Figure 6:
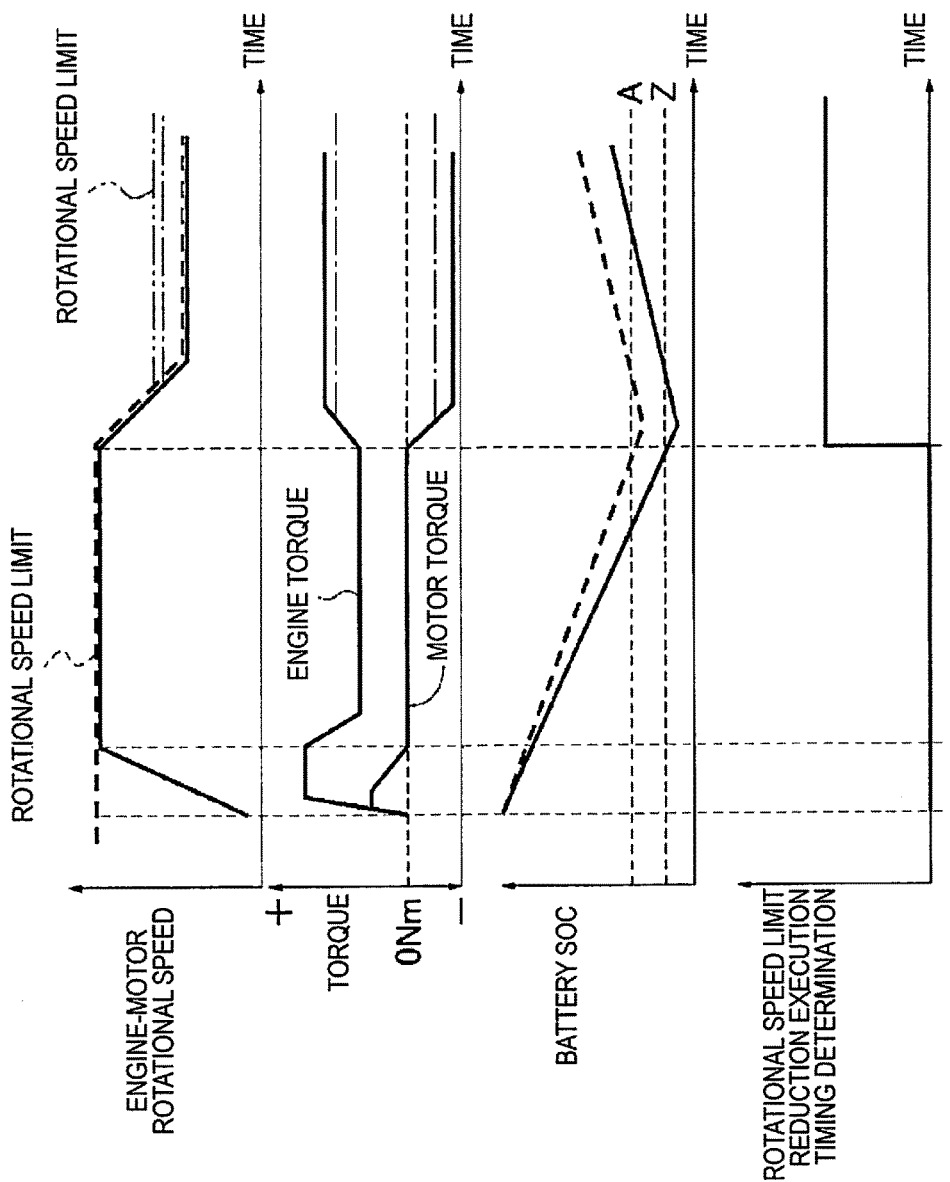
FIG. 6 is a time chart illustrating an operational example of the rotational speed limit variable action by a battery SOC of the first embodiment.

In addition, as illustrated by the time chart in FIG. 6, the rotational speed limit La (dotted line in FIG. 6) is reduced to less than the rotational speed limit Lb1 (dashed-dotted line in FIG. 6) illustrated by time t2 in FIG. 5, when the battery SOC is charged from a threshold value Z that is lower than the threshold value A. The reason for the slope of decrease of the battery SOC being different for threshold value A and threshold value Z shall be due to the magnitude of the auxiliary machine power consumption. FIG. 6 is the same as FIG. 5 other than the point that the rotational speed limit La is reduced more as the battery SOC is decreased and that the auxiliary machine power consumption and the accelerator position opening amount of FIG. 5 is omitted from the vertical axis of FIG. 6; therefore, the same names and times t are provided, and the descriptions thereof are omitted. A case in which the rotational speed limit La is reduced when the battery SOC is equal to or less than the threshold value A is illustrated by the dashed-dotted line (the rotational speed limit is illustrated by the chain double-dashed line). Additionally, operations such as restoring the rotational speed limit Lb are omitted in FIG. 6.

By reducing the rotational speed limit La more as the battery SOC is decreased in this manner, the power generation amount can be increased, and the battery SOC can be increased.

As a result, the battery SOC can be increased and the EV traveling mode becomes easy to select, allowing the fuel efficiency to be improved.

Figure 7:
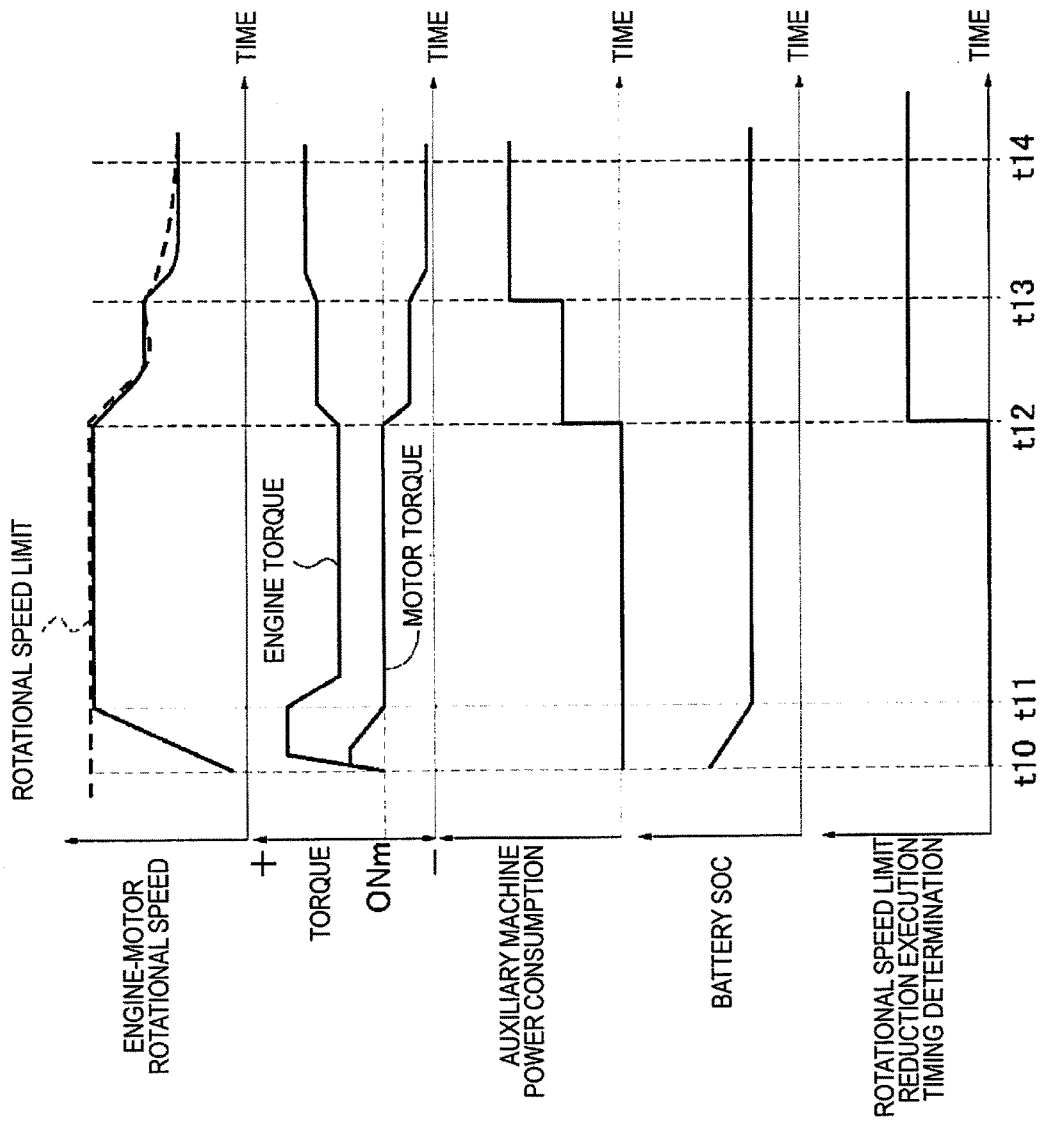
FIG. 7 is a time chart illustrating an operational example of the rotational speed limit variable action by the auxiliary machine power consumption of the first embodiment.

Furthermore, the energy storage requirement is determined to be higher as the auxiliary machine power consumption is increased. This rotational speed limit variable action by the auxiliary machine power consumption will be described in detail below, with respect to the time chart in FIG. 7. The same parts as FIG. 5 are given the same names, and the descriptions thereof are omitted. In addition, when the operation is the same as the operation at time t in FIG. 5, the time t of FIG. 5 is provided in parentheses, and the description thereof is omitted. The vertical axis of FIG. 7 is the same as FIG. 5, other than the point that the accelerator position opening amount of FIG. 5 is omitted.

The auxiliary machine power consumption is assumed to be not outputted at time t10 (time t0), time t10-time t11 (time t0-time t1), and time t11 (time W.

Between time t11-time t12, the auxiliary machine power consumption is not being outputted and the motor torque is zero, so the battery SOC is constant.

At time t12, the auxiliary machine power consumption is being outputted. That is, a power generation torque output request of the motor/generator MG is present. In FIG. 7, it is determined to be the execution timing for reducing the rotational speed limit La due to the output of the auxiliary machine power consumption. Accordingly, the rotational speed limit La is reduced the rotational speed limit Lb at which a power generation torque that can cover for the auxiliary machine power consumption can be outputted. Otherwise, the actions are the same as time t2, so the descriptions thereof are omitted.

Time t12-time t13 is the same as time t2-time t3.

At time t13, the auxiliary machine power consumption is increased, so the rotational speed limit is reduced further to the rotational speed limit Lb at which a power generation torque that can cover for this auxiliary machine power consumption can be outputted. Otherwise, the actions are the same as time t12, so the descriptions thereof are omitted.

Between time t13-time t14, other than further reducing the rotational speed limit Lb in accordance with the increase in the auxiliary machine power consumption, the actions are the same as between time t12-time t13, so the descriptions thereof are omitted. The descriptions beyond time t14 are omitted.

That is, as illustrated between time t12-time t14 in the time chart in FIG. 7, the rotational speed limit La is reduced to the rotational speed limit Lb at which a power generation torque that can cover for the auxiliary machine power consumption can be outputted, in accordance with the magnitude of the auxiliary machine power consumption.

As a result, by determining the rotational speed limit Lb to be reduced in accordance with the magnitude of the auxiliary machine power consumption, a reduction of the battery SOC can be prevented without reducing the rotational speed limit La more than necessary.

Rotational Speed Limit Reduction Execution Timing Determination Control Action

In the first embodiment, a configuration was employed in which the execution timing for reducing the rotational speed limit La is determined in accordance with the energy storage requirement with respect to the battery.

That is, the execution timing for reducing the rotational speed limit La is shifted in accordance with the energy storage requirement with respect to the battery SOC.

As a result, it is possible to make the driver less likely to notice that the rotational speed limit La has been reduced.

In particular, by making the energy storage requirement at least the battery SOC, a reduction of the rotational speed limit La is put on hold even if an auxiliary machine power consumption occurs (time t1-time t2). In other words, when the battery SOC becomes equal to or less than the threshold value A (time t2, etc.), the rotational speed limit La is reduced to match the charging of the battery SOC.

As a result, it is possible to make the driver even less likely to notice that the rotational speed limit La has been reduced.

Figure 8:
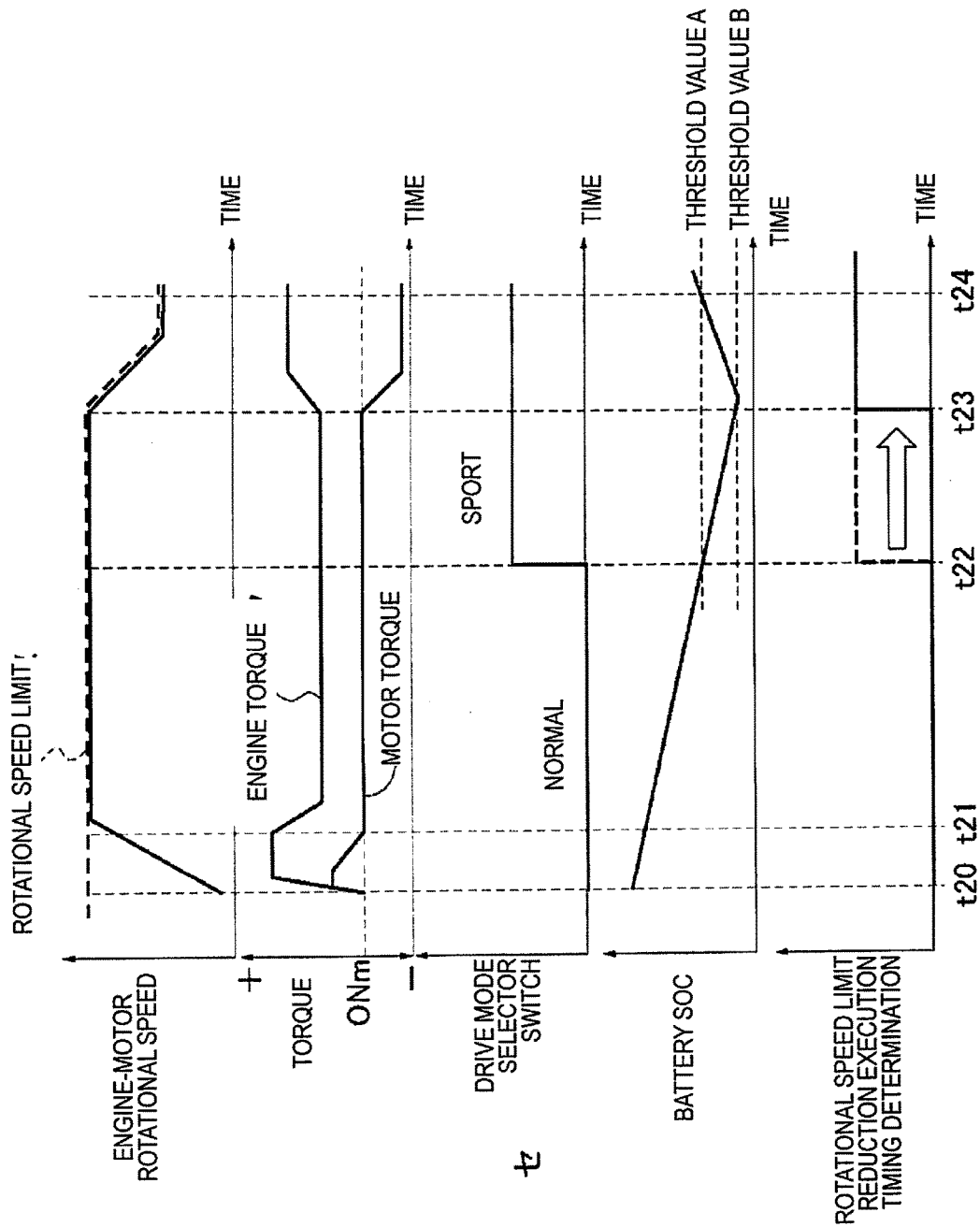
FIG. 8 is a time chart illustrating an operational example of the rotational speed limit reduction execution timing delay determination control action of the first embodiment.

In addition, a rotational speed limit reduction execution timing determination control was employed in which, for example, the execution timing is delayed more if the driver's acceleration intent is strong, compared to when the driver's acceleration intent is weak. This rotational speed limit reduction execution timing delay determination control action is described in detail below, with respect to the time chart in FIG. 8. The same parts as FIG. 5 are given the same names, and the descriptions thereof are omitted. In addition, when the operation is the same as the operation at time t in FIG. 5, the time t of FIG. 5 is provided in parentheses, and the description thereof is omitted. The vertical axis of FIG. 8 is the same as FIG. 5, other than the point that the auxiliary machine power consumption (constant in FIG. 8) and the accelerator position opening amount of FIG. 5 are omitted, and that a drive mode selector switch (drive mode switch) has been added.

This switch is a selector switch for the normal traveling mode (when the driver's acceleration intent is weak) or the sport traveling mode (when the driver's acceleration intent is strong). The normal traveling mode is as described above. In the sport traveling mode (a mode that emphasizes the response performance), at least one of the characteristics described for the normal traveling mode is set to a characteristic suitable for sports traveling. The load becomes higher in the sport traveling mode.

In addition, the threshold value B of the battery SOC in the case of the sport traveling mode is a value at which charging is forcibly started even during the assist traveling mode, as it is necessary to charge the battery SOC. That is, as the threshold value is the threshold value A in the normal traveling mode and the threshold value B in the sport traveling mode, the threshold values of the battery SOC are different in these traveling modes.

The drive mode selector switch is in the normal traveling mode at time t20 (time t0), time t20-time t21 (time t0-time t1), time t21 (time t1), and time t21-time t22 (time t1-time t2). The battery SOC is reduced due to the battery SOC covering for the auxiliary machine power consumption.

At time t22, the normal traveling mode is switched to the sport traveling mode by the driver operating the drive mode selector switch. Accordingly, the threshold value A of the battery SOC is switched to the threshold value B. At this time, since the battery SOC will be equal to or less than the threshold value A if in the normal traveling mode, a power generation torque output request of the motor/generator MG is present, and it is determined to be an execution timing for reducing the rotational speed limit La. However, since the threshold value is switched to the threshold value B of the battery SOC along with switching to the sport traveling mode, the execution timing for reducing the rotational speed limit La is also switched. In other words, the execution timing for reducing the rotational speed limit La is delayed.

Between time t22-time t23, the mode is set to the sport traveling mode. During this time, the battery SOC is reduced due to the battery SOC covering for the auxiliary machine power consumption.

At time t23, the battery SOC is equal to or less than the threshold value B during the sport traveling mode. That is, a power generation torque output request of the motor/generator MG is present, and it is determined to be an execution timing for reducing the rotational speed limit La. Accordingly, the rotational speed limit La is reduced the rotational speed limit Lb at which a power generation torque that can charge the battery SOC can be outputted.

Between time t23-time t24, the battery SOC is charged from a threshold value B which is lower than the threshold value A; therefore, as stated in FIG. 6, the rotational speed limit La is reduced to less than the rotational speed limit Lb in the case of threshold value B, compared to the rotational speed limit Lb1 in the case of threshold value A. Otherwise, the actions are the same as time t4-time t5, so the descriptions thereof are omitted. The descriptions beyond time t24 are omitted.

In other words, the execution timing is delayed as illustrated at time t22 in the time chart in FIG. 8. Accordingly, during the sport traveling mode (when the driver's acceleration intent is strong), priority is given more to power performance than to charging the battery SOC.

Therefore, during the sport traveling mode (when the driver's acceleration intent is strong) and when the battery SOC becomes equal to or less than the threshold value A, the rotational speed limit La is not reduced; therefore, the maximum rotational speed of the engine Eng can be fully used.

As a result, critical traveling becomes possible without imparting dissatisfaction to the driver.

Rotational Speed Limit Deviation Control Action

A configuration was employed in which, the reduced rotational speed limit Lb is restored to the rotational speed limit La which is set by the rotational speed limit setting unit 411, when a deviation condition is met, in which the engine-motor rotational speed Nem deviates from the reduced rotational speed limit Lb.

For example, if restored to the rotational speed limit La when the battery SOC allowed in the engine generation traveling mode is charged to a threshold value A', the driver may notice and feel uncomfortable.

That is, since the rotational speed limit La is reduced at a timing that will not be noticed by the driver, a deviation condition to return the rotational speed limit Lb to the rotational speed limit La without being noticed by the driver (without imparting discomfort) is required.

As a result, by restoring to the rotational speed limit La when a deviation condition is satisfied (time t6), it is possible to not let the driver notice that the rotational speed limit has been restored.

In particular, by setting the deviation condition (time t6) to when the engine-motor rotational speed Nem is reduced to equal to or less than a threshold value C, hunting of the engine-motor rotational speed Nem caused by repetitive reduction and restoration of the rotational speed limit La can be prevented.

As a result, it is possible to make the driver even less likely to notice that the rotational speed limit has been restored.

In addition, for example, restoring the reduced rotational speed limit Lb to the rotational speed limit La, which is set by the rotational speed limit setting unit 411, when the driver's acceleration intent is strong, was employed as the deviation condition. This rotational speed limit deviation control action by the driver's acceleration intent will be described in detail below, with respect to the time chart in FIG. 9. The same parts as FIG. 5 are given the same names, and the descriptions thereof are omitted. In addition, when the operation is the same as the operation at time t in FIG. 5, the time t of FIG. 5 is provided in parentheses, and the description thereof is omitted. The vertical axis in FIG. 9 is the same as FIG. 5, other than the point that the auxiliary machine power consumption (constant in FIG. 9) of FIG. 5 is omitted.

Time t30 (time t0), time t30-time t31 (time t0-time t1), time t31 (time t1), and time t31-time t32 (time t1-time t2) are the same as FIG. 5, so the descriptions thereof are omitted.

At time t32, other than setting the rotational speed limit La to the reduced rotational speed limit Lb for charging the battery SOC, the actions are the same as time t3, so the descriptions thereof are omitted.

Figure 9:
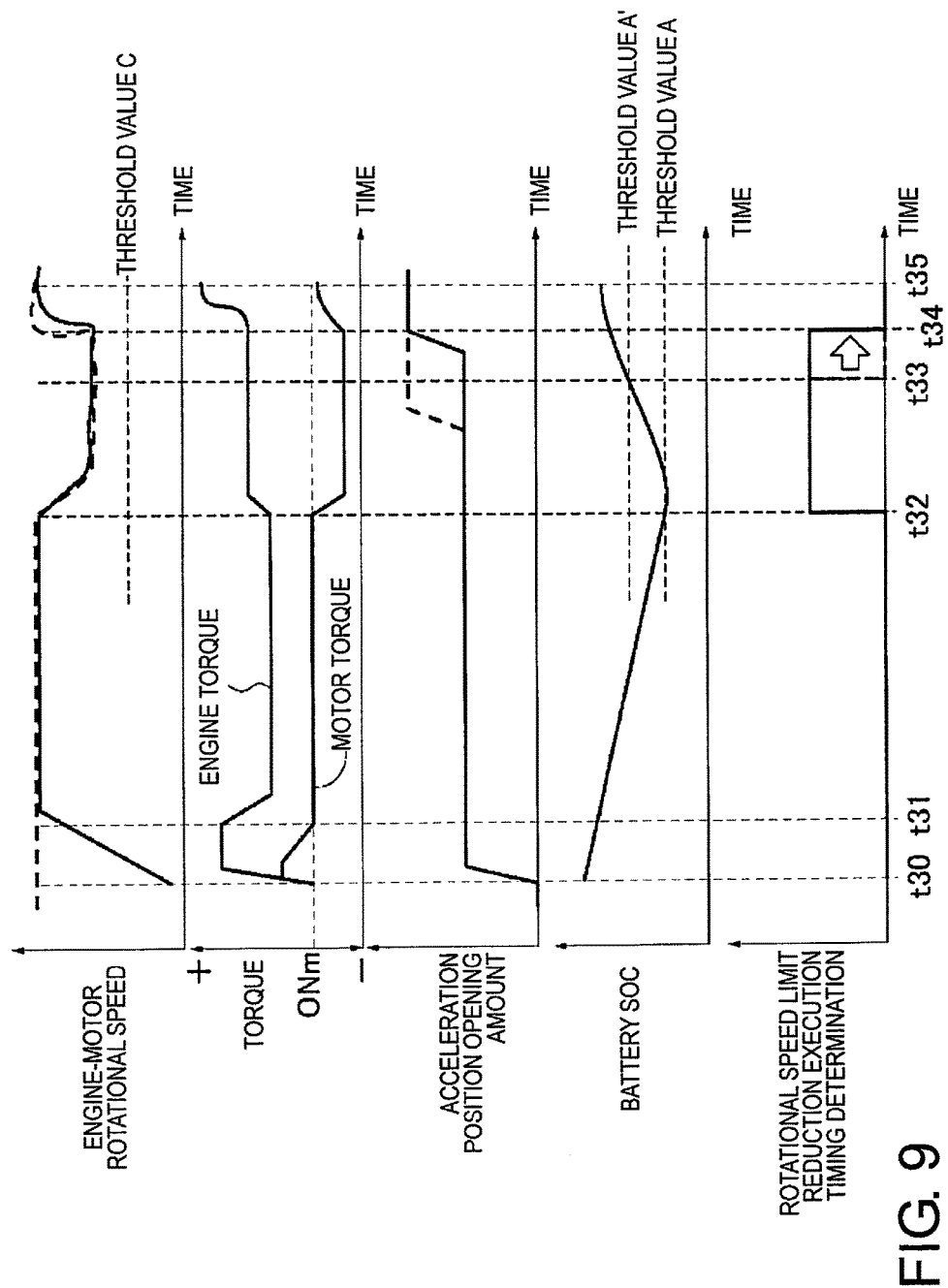
FIG. 9 is a time chart illustrating an operational example of the rotational speed limit deviation control action by the driver's acceleration intent.

Between time t32-t33, the amount of generated power by the power generation torque is an amount of generated power that can charge the battery SOC, as illustrated in FIG. 9. The battery SOC is charged for this reason.

The actions at time t33 (time t4) are the same as FIG. 5, so the descriptions thereof are omitted.

Between time t33-time t34, the driver is depressing the accelerator and the accelerator position opening amount APO is increasing. Otherwise, the actions are the same as time t4-time t5, so the descriptions thereof are omitted.

At time t34, the accelerator position opening amount APO is increased further, and the driver's acceleration intent is stronger (higher load, for example, the sport traveling mode). That is, since the deviation condition is satisfied, the rotational speed limit Lb is restored to the rotational speed limit La. As a result, the engine-motor rotational speed Nem and the engine torque are increased. At this time, the motor/generator MG is still outputting a power generation torque.

Between time t34-time t35, the engine-motor rotational speed Nem and the engine torque are being increased, in accordance with the accelerator position opening amount APO. Additionally, the engine torque motor/generator MG is still outputting a power generation torque. The descriptions beyond time t34 are omitted.

In other words, since the rotational speed limit Lb is restored to the rotational speed limit La when the driver's acceleration intent is strong (time t34), it is possible to not let the driver notice that the rotational speed limit has been restored. In addition, if the rotational speed limit Lb is not restored at this time, not only is discomfort imparted to the driver, but also the needs of the driver cannot be reflected.

As a result, it is possible to make the driver less likely to notice that the rotational speed limit has been reduced, and to reflect the needs of the driver even when restoring the rotational speed limit.

In addition, as illustrated by the dashed-dotted line in the accelerator position opening amount APO of FIG. 9, when the battery SOC is being charged and the battery SOC is less than the threshold value A', the rotational speed limit Lb is restored to the rotational speed limit La, even if the driver's acceleration intent becomes stronger.

As a result, it is possible to make the driver less likely to notice that the rotational speed limit has been restored, and to reflect the needs of the driver when restoring the rotational speed limit.

Next, the effects are described. The effects listed below can be obtained with the FR hybrid vehicle control device according to the first embodiment.

(1) A control device for a hybrid vehicle comprising, in the drive system: an engine Eng; a motor/generator MG to which is connected a battery 4 that carries out charging/discharging; a transmission (automatic transmission AT) in which a gear ratio can be fixed by a driver's intention; and drive wheels (left rear wheel RL, right real wheel RR), further comprising an assist traveling mode in which the motor/generator MG outputs a drive torque, and an engine generation traveling mode in which the motor/generator MG outputs a power generation torque, as hybrid modes (hybrid vehicle traveling mode) in which the engine Eng and the motor/generator MG are drive sources, provided with a rotational speed limit setting means (rotational speed limit setting unit 411) which sets a value that exceeds the upper rotational speed limit, at which the motor/generator MG can carry out a torque output, as a rotational speed limit La of an engine-motor rotational speed Nem, and a rotational speed limit control means (rotational speed limit control unit 413) for reducing the rotational speed limit La to a rotational speed (rotational speed limit Lb) at which the motor/generator MG can carry out a torque output, when the engine-motor rotational speed Nem has reached the rotational speed limit La and when there is a torque output request of the motor/generator MG, during the assist traveling mode. Accordingly, an assist request or a power generation request can be met while reflecting the high-load travel request of the driver.

(2) The rotational speed limit control means (rotational speed limit control unit 413) reduces the rotational speed limit La more, as an energy storage requirement with respect to the battery SOC is increased (FIG. 4). Accordingly, in addition to the effect of (1), the electric storage requirement can be reliably met, by reducing to a rotational speed limit Lb corresponding to the energy storage requirement.

(3) The rotational speed limit control means (rotational speed limit control unit 413) determines the energy storage requirement to be higher, as an auxiliary machine power consumption, which is consumed by a plurality of auxiliary machines provided to a vehicle, is increased (FIG. 4). Accordingly, in addition to the effects of (1)-(2), by determining a rotational speed limit Lb to be reduced in accordance with the magnitude of the auxiliary machine power consumption, a reduction of the battery SOC can be prevented without reducing the rotational speed limit more than necessary.

(4) The rotational speed limit control means (rotational speed limit control unit 413) determines the energy storage requirement to be higher, as a charge capacity of the battery (battery SOC) is reduced (FIG. 4). Accordingly, in addition to the effects of (1)-(3), preventing the battery SOC from being reduced to less than a threshold value A is possible. In addition, the battery SOC can be increased and the EV traveling mode becomes easy to select, allowing the fuel efficiency to be improved.

(5) The rotational speed limit control means (rotational speed limit control unit 413) determines an execution timing for reducing the rotational speed limit La, in accordance with an energy storage requirement with respect to the battery SOC (FIG. 4). Accordingly, in addition to the effects of (1)-(4), it is possible to make the driver less likely to notice that the rotational speed limit La has been reduced.

(6) The energy storage requirement is at least the charge capacity of the battery (the battery SOC is equal to or less than the threshold value A) (FIG. 4). Accordingly, in addition to the effects of (1)-(5), it is possible to make the driver even less likely to notice that rotational speed limit La has been reduced.

(7) The rotational speed limit control means (rotational speed limit control unit 413) delays the execution timing more when the driver's acceleration intent is strong (sport traveling mode, etc.), compared to when the driver's acceleration intent is weak (normal traveling mode, etc.) (FIG. 3). Accordingly, in addition to the effects of (1)-(4) as well as (5) or (6), critical traveling becomes possible without imparting dissatisfaction to the driver.

(8) The rotational speed limit control means (rotational speed limit control unit 413) restores the reduced rotational speed limit Lb to a rotational speed limit La which is set by the rotational speed limit setting means (rotational speed limit setting unit 411), when a deviation condition is met, in which the engine-motor rotational speed Nem deviates from a reduced rotational speed limit Lb (FIG. 4). Accordingly, in addition to the effects of (1)-(7), it is possible to make the driver less likely to notice that the rotational speed limit has been restored.

(9) The rotational speed limit control means (rotational speed limit control unit 413) sets when the engine-motor rotational speed Nem is reduced to equal to or less than a predetermined value (threshold value C) as the deviation condition (FIG. 4). Accordingly, in addition to the effects of (1)-(8), it is possible to make the driver even less likely to notice that the rotational speed limit has been restored.

(10) The rotational speed limit control means (rotational speed limit control unit 413) restores the reduced rotational speed limit Lb to a rotational speed limit La which is set by the rotational speed limit setting means (rotational speed limit setting unit 411), when the driver's acceleration intent is strong (sport traveling mode, etc.) (FIG. 3). Accordingly, in addition to the effects of (1)-(9), it is possible to make the driver less likely to notice that the rotational speed limit has been restored, and to reflect the needs of the driver when restoring the rotational speed limit.

The hybrid vehicle control device of the present invention was described above based on the first embodiment, but specific configurations thereof are not limited to this first embodiment, and various modifications and additions to the design can be made without departing from the scope of the invention according to each claim in the Claims.

In the first embodiment, an automatic transmission AT was presented as the transmission. However, the configuration is not limited to that illustrated in the first embodiment. For example, the automatic transmission AT may be an MT transmission, a continuously variable transmission CVT, or the like.

In the first embodiment, an example was shown in which the control device of the present invention is applied to an FR hybrid vehicle. However, the configuration is not limited to that illustrated in the first embodiment. For example, the control device of the present invention can also be applied to an FF hybrid vehicle, etc. In short, the device can be applied to any control device of a vehicle having an engine Eng and a motor/generator MG as drive sources In the first embodiment, an example was shown in which the driver's acceleration intent is determined from the switching of the normal traveling mode and the sport traveling mode. However, the configuration is not limited to that illustrated in the first embodiment. For example, the driver's acceleration intent may be determined from one or more piece of information from among the accelerator position opening amount APO, the accelerator depression speed, the longitudinal acceleration, the steering angle, the vehicle speed VSP, or the like. Specifically, switching is carried out from a predetermined map or the like, while monitoring the degree and frequency of change of the accelerator position opening amount APO.

The invention claimed is:

1. A hybrid vehicle drive system comprising:
an engine;
a motor/generator connected to the engine and connected to a battery that carries out charging/discharging;
a transmission connected to the motor/generator, in which a gear ratio can be fixed by a driver's input;
a drive wheel connected to the transmission; and
a controller programmed to selectively set an assist traveling mode in which the motor/generator generates a drive torque, and an engine generation traveling mode in which the motor/generator generates a power generation torque, as hybrid modes in which the engine and the motor/generator are drive sources,
the controller being programmed to include:
a rotational speed limit setting unit programmed to set a value that exceeds an upper rotational speed, at which the motor/generator can generate a requested torque, as a rotational speed limit of the motor/generator, and
a rotational speed limit control unit programmed to reduce the rotational speed limit to the upper rotational speed at which the motor/generator can generate the requested torque, when a rotational speed of the motor/generator has reached the rotational speed limit, and a request for the requested torque of the motor/generator exists, during the assist traveling mode in a state in which the gear ratio is fixed by the driver's input,
the requested torque being a requested drive torque or a requested power generation torque.

2. The hybrid vehicle drive system according to claim 1, wherein
the rotational speed limit control unit is programmed to further reduce the rotational speed limit as an energy storage requirement with respect to the battery is increased.

3. The hybrid vehicle drive system according to claim 2, wherein
the rotational speed limit control unit is programmed to determine the energy storage requirement to increase as an auxiliary machine power consumption, which is consumed by a plurality of auxiliary machines provided to a vehicle, is increased.

4. The hybrid vehicle drive system according to claim 3, wherein
the rotational speed limit control unit is programmed to determine the energy storage requirement to increase as a charge capacity of the battery is reduced.

5. The hybrid vehicle drive system according to claim 2, wherein
the rotational speed limit control unit is programmed to determine the energy storage requirement to increase as a charge capacity of the battery is reduced.

6. The hybrid vehicle drive system according to claim 2, wherein
the rotational speed limit control unit is programmed to determine an execution timing for reducing the rotational speed limit in accordance with an energy storage requirement with respect to the battery.

7. The hybrid vehicle drive system according to claim 6, wherein
the energy storage requirement is at least the charge capacity of the battery.

8. The hybrid vehicle drive system according to claim 6, wherein
the rotational speed limit control unit is programmed to delay the execution timing more as a driver's acceleration request becomes greater.

9. The hybrid vehicle drive system according to claim 2, wherein
the rotational speed limit control unit is programmed to restore the rotational speed limit to the rotational speed limit which is set by the rotational speed limit setting unit, when a deviation condition is met, in which the rotational speed of the motor/generator deviates from a reduced rotational speed limit.

10. The hybrid vehicle drive system according to claim 9, wherein
the rotational speed limit control unit is programmed to set an occurrence of the rotational speed of the motor/generator being reduced to equal to or less than a predetermined value as the deviation condition.

11. The hybrid vehicle drive system according to claim 2, wherein
the rotational speed limit control unit is programmed to restore the rotational speed limit to the rotational speed limit which is set by the rotational speed limit setting unit, when a driver's acceleration input is determined to exceed a second predetermined value.

12. The hybrid vehicle drive system according to claim 1, wherein
the rotational speed limit control unit is programmed to determine an execution timing for reducing the rotational speed limit in accordance with an energy storage requirement with respect to the battery.

13. The hybrid vehicle drive system according to claim 12, wherein
the energy storage requirement is at least the charge capacity of the battery.

14. The hybrid vehicle drive system according to claim 12, wherein
the rotational speed limit control unit is programmed to delay the execution timing more as a driver's acceleration request becomes greater.

15. The hybrid vehicle drive system according to claim 1, wherein
the rotational speed limit control unit is programmed to restore the rotational speed limit to the rotational speed limit which is set by the rotational speed limit setting unit, when a deviation condition is met, in which the rotational speed of the motor/generator deviates from a reduced rotational speed limit.

16. The hybrid vehicle drive system according to claim 15, wherein
the rotational speed limit control unit is programmed to set an occurrence of the rotational speed of the motor/generator being reduced to equal to or less than a predetermined value as the deviation condition.

17. The hybrid vehicle drive system according to claim 1, wherein
the rotational speed limit control unit is programmed to restore the rotational speed limit to the rotational speed limit which is set by the rotational speed limit setting unit, when a driver's acceleration input is determined to exceed a second predetermined value.

* * * * *